(12) United States Patent
Remfry

(10) Patent No.: US 11,904,681 B2
(45) Date of Patent: Feb. 20, 2024

(54) REFUELLING COUPLING

(71) Applicant: Leigh Maxwell Remfry, Waterlooville (GB)

(72) Inventor: Leigh Maxwell Remfry, Waterlooville (GB)

( * ) Notice: Subject to any disclaimer, the term of this patent is extended or adjusted under 35 U.S.C. 154(b) by 0 days.

(21) Appl. No.: 17/495,263

(22) Filed: Oct. 6, 2021

(65) Prior Publication Data
US 2022/0185103 A1 Jun. 16, 2022

(30) Foreign Application Priority Data
Oct. 5, 2020 (GB) ..................................... 2015726

(51) Int. Cl.
*B60K 15/04* (2006.01)
*B60K 15/03* (2006.01)

(52) U.S. Cl.
CPC ........ *B60K 15/0406* (2013.01); *B60K 2015/03394* (2013.01); *B60K 2015/0429* (2013.01);
(Continued)

(58) Field of Classification Search
CPC ...... B60K 15/0406; B60K 2015/03394; B60K 2015/0429; B60K 2015/0438
(Continued)

(56) References Cited

U.S. PATENT DOCUMENTS

| 5,944,075 A | 8/1999 | Turner et al. | |
| 2013/0032248 A1* | 2/2013 | Mitrovich | B67D 7/367 141/303 |

(Continued)

FOREIGN PATENT DOCUMENTS

| DE | 102008033747 A1 | 2/2009 |
| EP | 1526319 B1 | 5/2007 |

(Continued)

OTHER PUBLICATIONS

WIPO, PCT Form ISA 210, International Search Report for PCT/GB2013/000168, pp. 4 (dated Sep. 5, 2013).
(Continued)

*Primary Examiner* — Mahmoud Gimie
(74) *Attorney, Agent, or Firm* — UltimatEdge IP Law Group, P.C.; Dean G. Stathakis

(57) ABSTRACT

A refueling coupling has an annular fitting 101 having a bore 102, bayonet lugs 103 and slots 104 suiting it for connection to a pressure filling nozzle. A flange 122, drilled with screw holes for securement to a fuel tank (not shown), extends out from the fitting 101. Also not shown for the sake of clarity is a tube extending own from the flange. Rods extend down from the flange 122 to a spider 125, with springs bearing upwards onto the underside of a dry-break member 105, through which the rods extend. The rods, springs and spider are within the non-shown tube.

On attaching and opening of a pressure filling nozzle to the coupling, the dry-break member 105 is displaced resiliently inwards fuel can flow past this member and into the tank.

The dry-break member has a central aperture 111, normally closed by a plug 112, which is threaded externally 114 and carries an O-ring seal 115 above the thread. The central aperture has a plain bore orifice 116 and is threaded 117 below the plain bore. Thus, when the plug is screwed in, the dry-break member is fluid tight as normal.

13 Claims, 4 Drawing Sheets

(52) U.S. Cl.
CPC ............... *B60K 2015/0438* (2013.01); *B60K 2015/0451* (2013.01)

(58) Field of Classification Search
USPC ...................................................... 220/86.2
See application file for complete search history.

(56) References Cited

U.S. PATENT DOCUMENTS

| | | |
|---|---|---|
| 2013/0313818 A1 | 11/2013 | Remfry |
| 2014/0174580 A1 | 6/2014 | Jean |
| 2018/0099861 A1* | 4/2018 | Mitrovich ............ B67D 7/3218 |
| 2020/0031660 A1* | 1/2020 | Mitrovich ................ B67D 7/04 |
| 2020/0071059 A1* | 3/2020 | Ryan ...................... B65D 83/42 |

FOREIGN PATENT DOCUMENTS

| | | | | |
|---|---|---|---|---|
| EP | 2186669 B1 | | 2/2012 | |
| EP | 2822794 B1 | | 12/2015 | |
| GB | 2529928 A | * | 3/2016 | ............ B60K 15/04 |
| GB | 2601052 A | * | 5/2022 | ......... B60K 15/0406 |
| WO | 2012020313 A2 | | 2/2012 | |
| WO | 2013132215 A2 | | 9/2013 | |
| WO | 2015185921 A1 | | 12/2015 | |

OTHER PUBLICATIONS

WIPO, PCT Form ISA 237, Written Opinion for PCT/GB2013/000168, pp. 6 (dated Sep. 5, 2013).
WIPO, PCT Form ISA 373, International Preliminary Report on Patentability or PCT/GB2013/000168, pp. 7 (dated Sep. 5, 2013).

\* cited by examiner

REFUELLING COUPLING

INTRODUCTION

This application claims the benefit of priority and is entitled to the filing date pursuant to 35 U.S.C. § 119(a) of Great Britain Patent Application GB 2015726.9, filed Oct. 5, 2020, the content of which is hereby incorporated by reference in its entirety.

The present invention relates to a refueling coupling.

BACKGROUND

My Earlier European Patent No 2822794 B (My Earlier European Patent) relates to a refueling coupling.

The background to My Earlier European Patent was that I had conceived its inventive concept of gravity refueling through an aperture in a pressure refueling dry-break member, with a subsidiary displaceable member normally closing the aperture, some years before an opportunity arose for its use. For pressure refueling, as routinely used in refueling aircraft for instance, attaching and opening a pressure refueling nozzle to the coupling displaces the dry-break member in a conventional manner for pumping of fuel through the coupling. On completion of refueling, the nozzle is disconnected with the dry-break member returning to its original position in contact with a complementary member in the nozzle with no fuel between them, whereby no fuel can escape on removal of the nozzle. This was conventional. For gravity refueling a subsidiary member in the dry-break member is displaced, allowing gravity refueling through the dry-break member. The gravity refueling is in the manner of forecourt refueling of cars for instance. After refueling, returning of the subsidiary member to its normal, closed position ensures that the coupling is closed for pressure refueling.

My Earlier European Patent was granted claiming:

"1. A refueling coupling having:
  an annular member,
  a fitting on the annular member complementary to a pressure refueling nozzle and
  a displaceable dry-break member in the coupling for normally sealing the coupling via a seal between the annular member and the dry-break member, the dry-break member being displaceable from its sealing position on connection of a pressure refueling nozzle,
  characterised in that the dry-break member includes:
    an aperture in the displaceable dry-break member and
    a subsidiary displaceable member carried by the dry-break member, this member normally closing the aperture and being displaceable by introduction of a gravity refueling nozzle into the aperture."

Claim 3 of My Earlier European Patent is as follows:

"3. A refueling coupling as claimed in claim 1, wherein the subsidiary displaceable member is pivotally displaceable with respect to the displaceable dry-break member against a subsidiary return spring."

The specific description of My Earlier European Patent describes the following specific embodiment:

"Referring to the drawings, the refueling coupling there shown has an annular fitting 1 having a bore 2, bayonet lugs 3 and slots 4 suiting it for connection to a pressure filling nozzle 50. A dry-break member 5 is provided within the annular fitting, normally sealing to it with the aid of an O-ring seal 6. When the pressure filling nozzle is fitted, the dry-break member is depressed allowing fuel to flow. In this respect, the refueling coupling is conventional.

In accordance with the invention, the dry-break member has a central aperture 11, normally closed by a side pivoted flap 12. The pivot 14 is at a pin 15 carried in lugs 16 on the underside of a central disc 17 having the aperture 11. The flap has a finger 17 projecting between the lugs and having the pin passing through it. A spring 18 is carried on the pin and normally biases the flap into its closed position parallel with the disc. An O-ring 19 is carried on the flap whereby should unusual forces displace fuel against the flap it does not leak.

For gravity nozzle fueling, as shown in FIGS. 4 & 5, a gravity fueling nozzle 52 is placed against the flap and pushed in against its spring. Refueling can now occur."

FIGS. 4 & 5 accompany this description.

SUMMARY OF THE INVENTION

The object of the present invention is to provide a further embodiment of the invention of My Earlier European Patent.

According to the invention there is provided a refueling coupling having:
  an annular member,
  a fitting on the annular member complementary to a pressure refueling nozzle and
  a displaceable dry-break member in the coupling for normally sealing the coupling via a seal between the annular member and the dry-break member, the dry-break member being displaceable from its sealing position on connection of a pressure refueling nozzle,
  an aperture in the displaceable dry-break member and
  a subsidiary displaceable member carried by the dry-break member, this member normally closing the aperture;
wherein:
  the subsidiary displaceable member is adapted to be manually removable from the dry-break member for gravity refueling.

Preferably, the subsidiary displaceable member is rotatably engageable in the dry-break member. This can be by a bayonet fitting arrangement, but will normally be by providing complementary screw threads on the members.

A graspable element can be provided on the subsidiary displaceable member. Conveniently this is arranged pivotally to lie flush with or beneath the outer surface of the dry-break member (for abutment of this with the complementary member in the nozzle) and be liftable for grasping and turning to screw out the subsidiary displaceable member.

A tether can be provided for tethering the subsidiary displaceable member to the coupling when removed for gravity refueling.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE INVENTION

Figure 1:
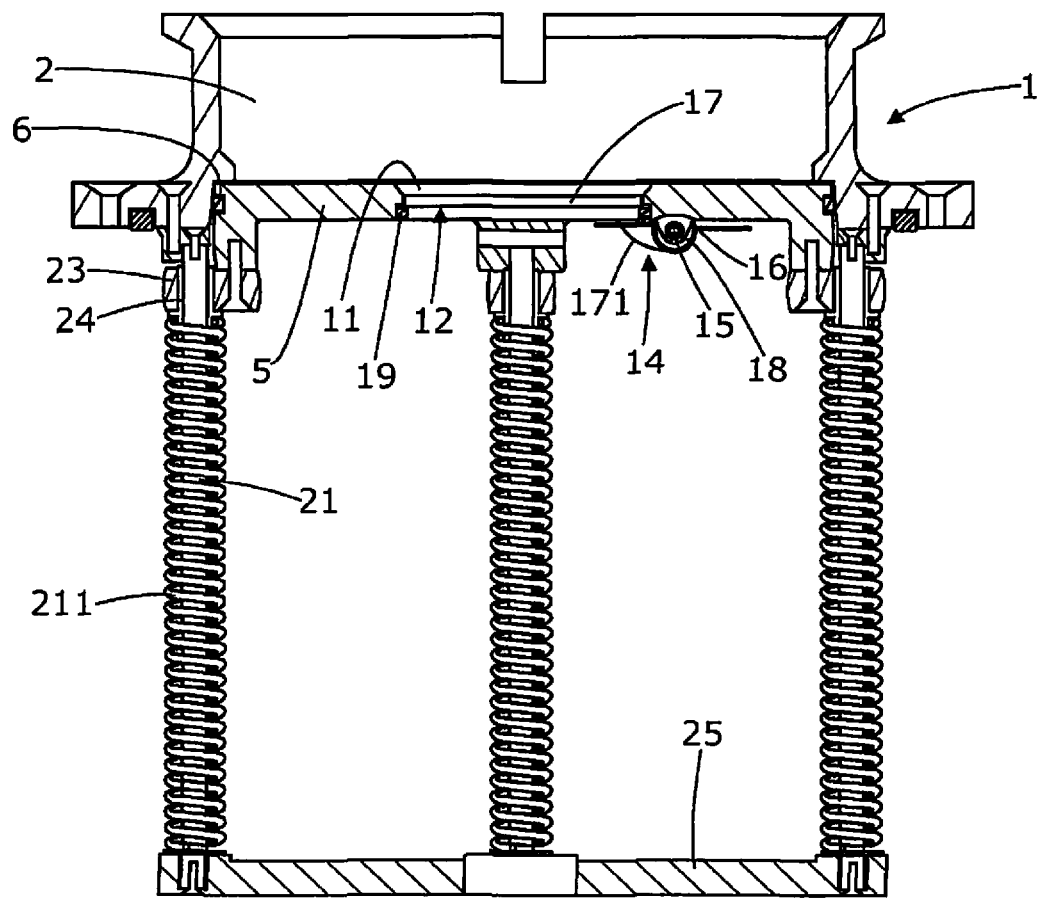
FIG. 1 is FIG. 3 of My Earlier European Patent.
Figure 2:
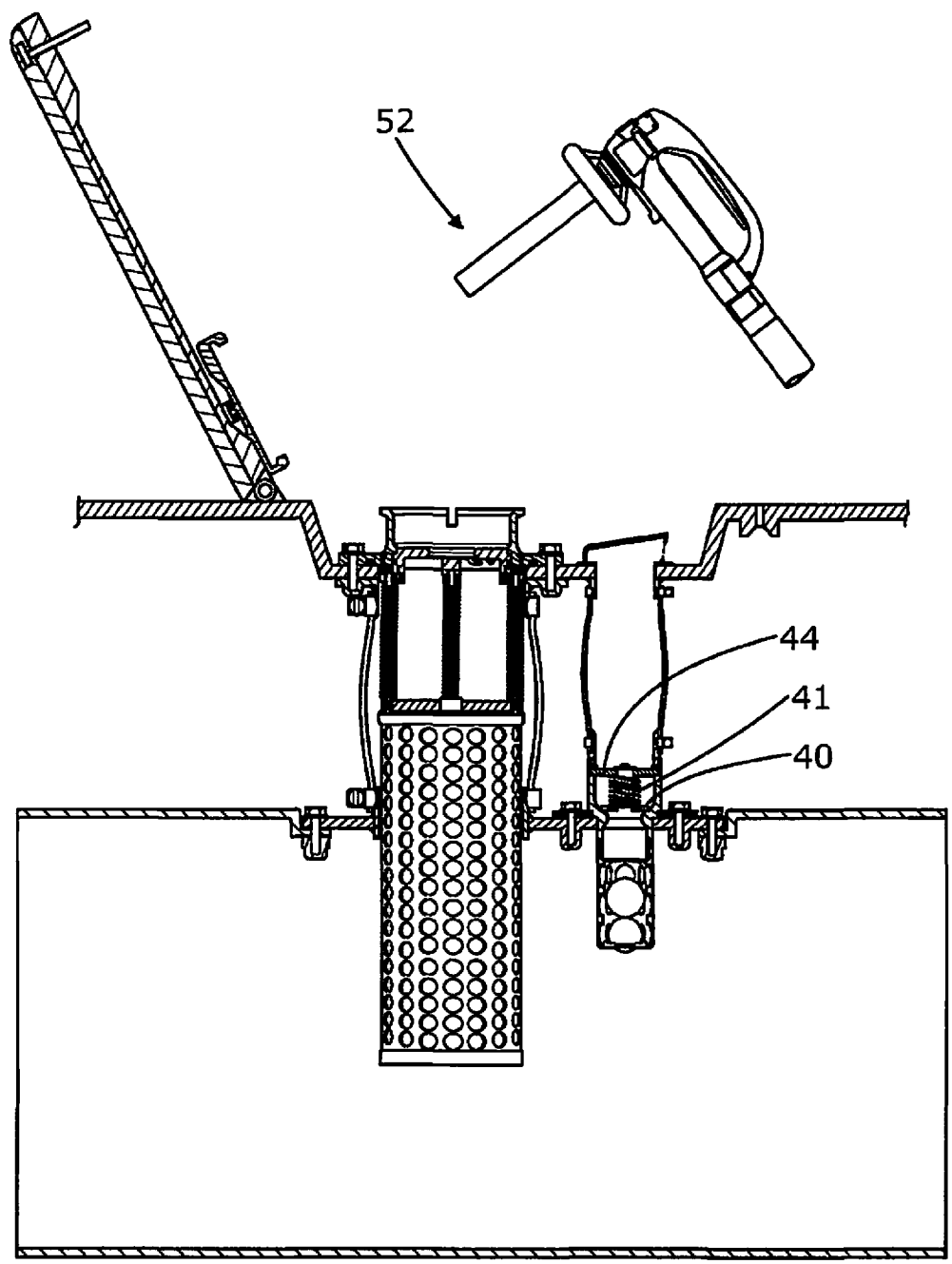
FIG. 2 is FIG. 4 of My Earlier European Patent.
Figure 3:
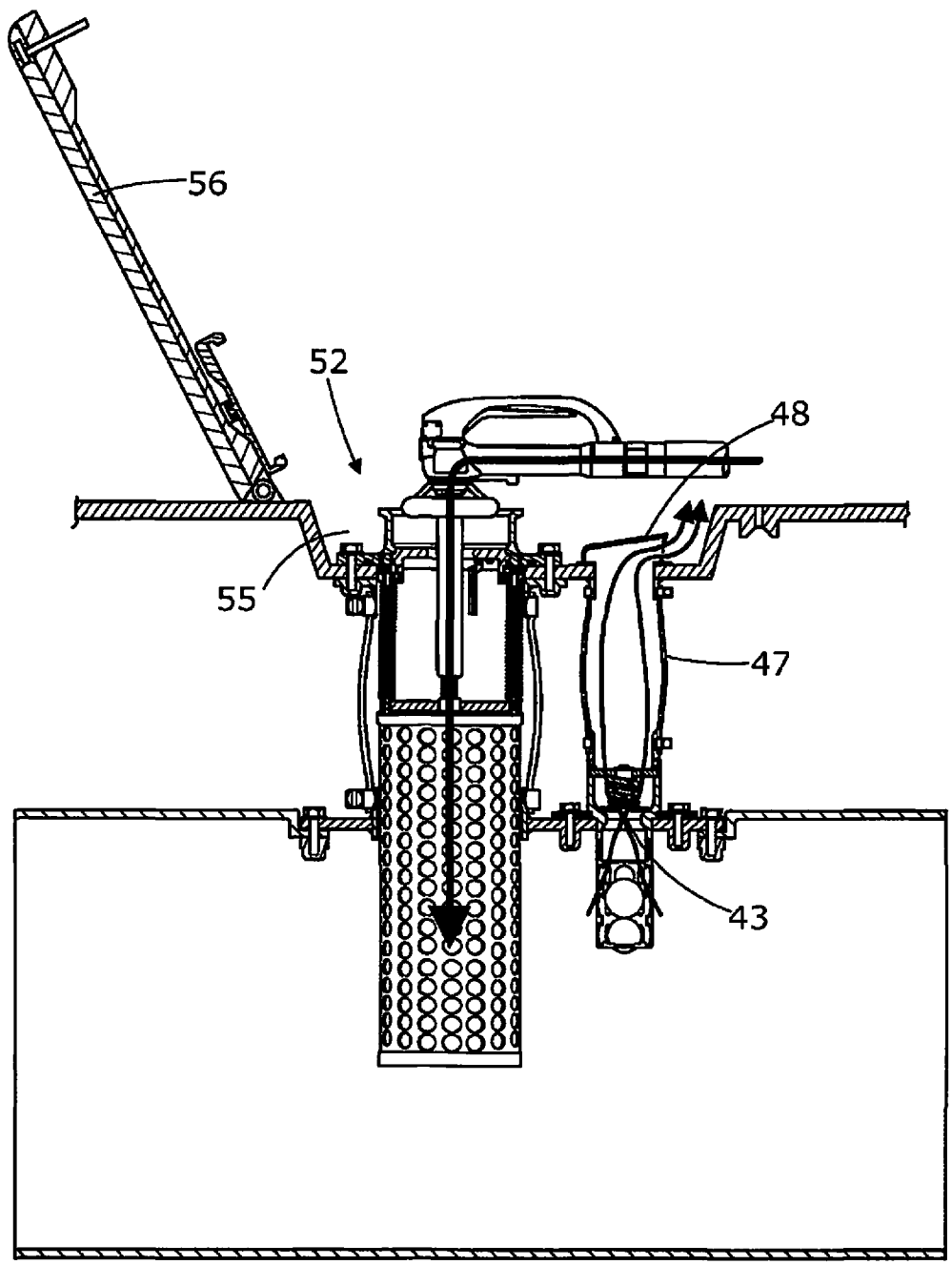
FIG. 3 is FIG. 5 of My Earlier European Patent.
Figure 4:
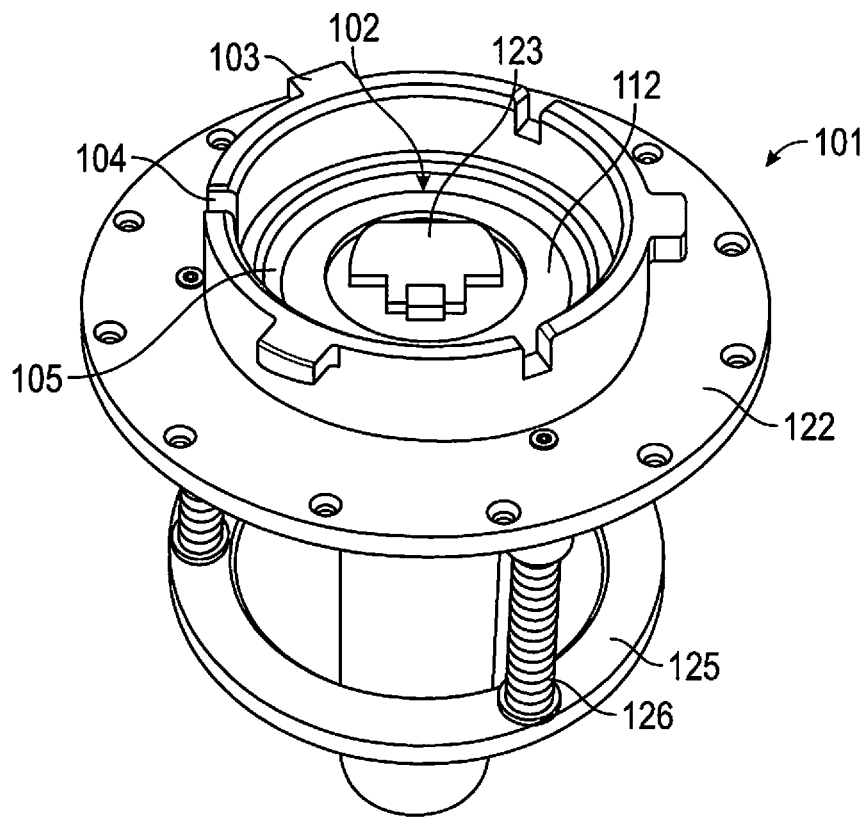
FIG. 4 is a perspective view of a refueling coupling of the present invention with its subsidiary displaceable member—or plug—in its normal closure position.
Figure 5:
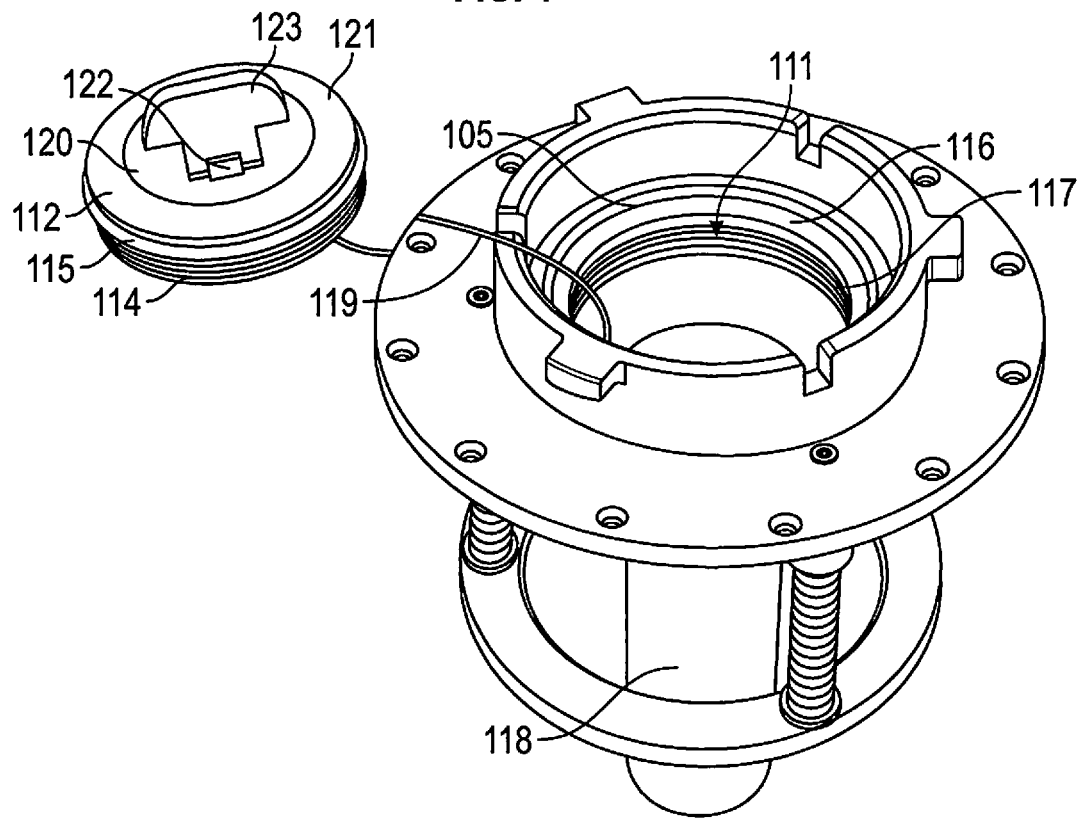
FIG. 5 is a like view with the plug unscrewed for gravity refueling.

Referring to the drawings, FIGS. 1, 2 and 3 from My Earlier European Patent have been described above. FIGS. 4 and 5 show an embodiment of the present invention. Its refueling coupling has an annular fitting 101 having a bore 102, bayonet lugs 103 and slots 104 suiting it for connection to a pressure filling nozzle (not shown). A flange 122, drilled with screw holes for securement to a fuel tank (not shown), extends out from the fitting 101. Also not shown for the sake of clarity is a tube extending down from the flange. Rods extend down from the flange 122 to a spider 125, with springs 126 bearing upwards onto the underside of a dry-break member 105, through which the rods extend. The rods, springs and spider are within the non-shown tube.

On attaching of a pressure filling nozzle to the coupling and opening of the nozzle, the dry-break member 105 is displaced inwards allowing fuel to flow past this member, within the tube into the tank.

In accordance with the invention, the dry-break member has a central aperture 111, normally closed by a plug 112, which is threaded externally 114 and carries an O-ring seal 115 above the thread. The central aperture has a plain bore orifice 116 and is threaded 117 below the plain bore. Thus, when the plug is screwed in, the dry-break member is fluid tight as normal.

An inner tube 118 extends down from the dry-break member within the non-shown outer tube and indeed within the rods, springs and spider.

A tether 119 is provided for avoidance of loss of the plug when unscrewed. The tether is connected at one end to the plug and the other within the inner tube 118.

In a manner analogous to FIG. 3, FIG. 5 of My Earlier European Patent, a gravity refueling nozzle can be inserted into the bore 102 and the orifice 116 for gravity refueling into the tank through the orifice 116 and the inner tube 118.

For removal of the plug and its refitting after gravity refueling, the plug is provided with a recess 120 in its outer surface 121, with a central spigot 122. A grip-able flap 123 is pivotally connected to the spigot. It can be pivoted up, as shown in FIG. 5, for turning of the plug for removal and refitting of the latter. Normally the flap lies not higher than the outer surface of the dry-break member, so as not to interfere with displacement of the dry-break member prior to opening of the pressure refueling nozzle for fuel flow.

The invention claimed is:

1. A refueling coupling having:
   an annular member,
   a fitting on the annular member complementary to a pressure refueling nozzle,
   a displaceable dry-break member in the coupling for normally sealing the coupling via a seal between the annular member and the dry-break member, the dry-break member being displaceable from its sealing position on connection of a pressure refueling nozzle,
   an aperture in the displaceable dry-break member, and
   a subsidiary displaceable member carried by the dry-break member, the subsidiary displaceable member being rotatably engageable with the dry-break member,
   wherein when the subsidiary displaceable member is rotatably engaged with the dry-break member, a fluid tight seal is formed between the subsidiary displaceable member and the dry-break member,
   wherein the subsidiary displaceable member is adapted to be manually removable from the dry-break member for gravity refueling by being rotatably engageable with the dry-break member.

2. A refueling coupling according to claim 1, wherein the subsidiary displaceable member is rotatably engageable in the dry-break member by a bayonet fitting arrangement.

3. A refueling coupling according to claim 1, wherein the subsidiary displaceable member is rotatably engageable in the dry-break member by provision of complementary screw threads on the dry-break and subsidiary displaceable members.

4. A refueling coupling according to claim 1, including a graspable element provided on the subsidiary displaceable member.

5. A refueling coupling according to claim 4, wherein the graspable element is arranged pivotally to lie flush with or beneath the outer surface of the dry-break member and be liftable for grasping and turning the subsidiary displaceable member.

6. A refueling coupling according to claim 1, including a tether for tethering the subsidiary dry-break member to the refueling coupling when removed for gravity refueling.

7. A refueling coupling comprising:
   an annular fitting configured to be complementary to a pressure refueling nozzle,
   a displaceable dry-break member configured to seal the refueling coupling, the dry-break member comprising an aperture and a removeable plug in the aperture, the removable plug being rotatably engageable with the dry-break member,
   wherein upon coupling of the pressure refueling nozzle to the annular fitting, the dry-break member is displaced to allow flow of a fluid into a fluid reservoir, and
   wherein upon removal of the removeable plug from the aperture, the fluid can flow into the fluid reservoir without displacement of the dry-break member.

8. The refueling coupling according to claim 7, wherein when the removeable plug is secured to the dry-break member, a fluid tight seal is formed between the removeable plug and the dry-break member.

9. The refueling coupling according to claim 7, wherein the removeable plug is rotatably engageable with the dry-break member by a bayonet fitting arrangement.

10. The refueling coupling according to claim 7, wherein the removeable plug is rotatably engageable with the dry-break member by provision of complementary screw threads on the removeable plug and the dry-break member.

11. The refueling coupling according to claim 7, wherein the removeable plug comprises a graspable element.

12. The refueling coupling according to claim 11, wherein the graspable element is arranged pivotally to lie flush with or beneath the outer surface of the dry-break member and be liftable for grasping and turning the removeable plug.

13. The refueling coupling according to claim 7, wherein the removeable plug comprises a tether for tethering the removeable plug to the refueling coupling when removed for gravity refueling.

* * * * *